United States Patent
Suk et al.

(10) Patent No.: US 10,155,202 B2
(45) Date of Patent: Dec. 18, 2018

(54) HOLLOW FIBRE MEMBRANE MODULE, MANUFACTURING METHOD THEREFOR, HEADER APPARATUS FOR HOLLOW FIBRE MEMBRANE MODULE AND HOLLOW FIBRE MEMBRANE RESTRAINING APPARATUS

(71) Applicants: SAMSUNG SDI CO., LTD., Yongin-si, Gyeonggi-do (KR); LOTTE CHEMICAL CORPORATION, Seoul (KR)

(72) Inventors: Eu Mine Suk, Uiwang-si (KR); Young Soo Son, Uiwang-si (KR); Dong Hyun Kim, Uiwang-si (KR); Gyu Hong Min, Uiwang-si (KR)

(73) Assignees: LOTTE ADVANCED MATERIALS CO. LTD., Yeosu-Si (KR); LOTTE CHEMICAL CORPORATION, Seoul (KR)

( * ) Notice: Subject to any disclaimer, the term of this patent is extended or adjusted under 35 U.S.C. 154(b) by 189 days.

(21) Appl. No.: 15/025,869

(22) PCT Filed: Sep. 29, 2014

(86) PCT No.: PCT/KR2014/009083
§ 371 (c)(1),
(2) Date: Mar. 29, 2016

(87) PCT Pub. No.: WO2015/046980
PCT Pub. Date: Apr. 2, 2015

(65) Prior Publication Data
US 2016/0220959 A1    Aug. 4, 2016

(30) Foreign Application Priority Data
Sep. 30, 2013  (KR) .................. 10-2013-0116960

(51) Int. Cl.
*B01D 63/02* (2006.01)
*B29C 65/54* (2006.01)
(Continued)

(52) U.S. Cl.
CPC .......... *B01D 63/022* (2013.01); *B01D 63/02* (2013.01); *B29C 65/54* (2013.01); *B29C 66/43* (2013.01);
(Continued)

(58) Field of Classification Search
CPC .... B01D 63/02; B01D 63/021; B01D 63/022; B01D 63/024; B01D 63/026; B01D 63/04;
(Continued)

(56) References Cited

U.S. PATENT DOCUMENTS 5,922,201 A    7/1999  Yamamori et al.
6,663,745 B1  12/2003  Cheng et al.
(Continued)

FOREIGN PATENT DOCUMENTS

CN    101432059 A    5/2009
EP    0 170 210      2/1986
(Continued)

OTHER PUBLICATIONS

KIPO Office Action dated Jun. 30, 2016 for corresponding Korean Patent Application No. 10-2013-0116960 (7 sheets).
(Continued)

*Primary Examiner* — Pranav N Patel
(74) *Attorney, Agent, or Firm* — Lewis Roca Rothgerber Christie LLP

(57) ABSTRACT

A hollow fiber membrane restraining apparatus comprising: first and second horizontal wall parts having slits therethrough, wherein the inner walls face one another; and two vertical wall parts erected facing both end parts of the first
(Continued)

horizontal wall parts in a horizontal axis direction, wherein a mat stacking part is formed and stacked on the first horizontal wall part such that end parts of mats on which hollow fiber membranes are arranged in a row can be aligned, and the second horizontal wall part is locked onto the vertical wall parts by pushing and restraining the mat stacking part; a header apparatus comprising the same; a hollow fiber membrane module; and a method for manufacturing a hollow fiber membrane module are provided.

20 Claims, 20 Drawing Sheets

(51) Int. Cl.
| | |
|---|---|
| *B29C 65/00* | (2006.01) |
| *C02F 1/44* | (2006.01) |
| *B29K 75/00* | (2006.01) |
| *B29K 105/08* | (2006.01) |
| *B29L 31/14* | (2006.01) |

(52) U.S. Cl.
CPC ...... *B01D 2313/04* (2013.01); *B01D 2313/21* (2013.01); *B01D 2313/22* (2013.01); *B01D 2313/26* (2013.01); *B01D 2315/06* (2013.01); *B29K 2075/00* (2013.01); *B29K 2105/0854* (2013.01); *B29L 2031/14* (2013.01); *C02F 1/444* (2013.01)

(58) Field of Classification Search
CPC .......... B01D 63/043; B01D 2201/0469; B01D 2201/0476; B01D 2201/0492; B01D 2201/291; B01D 2201/293; B01D 2201/295; B01D 2201/296
See application file for complete search history.

(56) References Cited

U.S. PATENT DOCUMENTS

| | | |
|---|---|---|
| 2002/0153299 A1 | 10/2002 | Mahendran et al. |
| 2009/0218274 A1 | 9/2009 | Sakashita et al. |
| 2010/0000938 A1 | 1/2010 | Szabo et al. |
| 2010/0200481 A1 | 8/2010 | Nakahara et al. |
| 2011/0031180 A1* | 2/2011 | Tada ............... B01D 63/022 210/321.81 |

FOREIGN PATENT DOCUMENTS

| | | |
|---|---|---|
| EP | 2 286 900 A1 | 2/2011 |
| JP | 11-128692 A | 5/1999 |
| JP | 2004-049976 A1 | 2/2004 |
| KR | 10-2001-0101721 | 11/2001 |
| KR | 10-2008-0112326 | 12/2008 |
| KR | 10-2010-0022976 | 3/2010 |
| KR | 10-2011-0127774 | 11/2011 |
| KR | 10-2013-0096683 | 8/2013 |
| WO | WO 2006/045191 A1 | 5/2006 |
| WO | WO 2013/100461 A1 | 7/2013 |
| WO | WO 2013/137313 A1 | 9/2013 |

OTHER PUBLICATIONS

European Search Report for corresponding European Application No. 14846890.3, European Search Report dated Mar. 30, 2017 (16 pgs.).

China Office Action dated Dec. 13, 2016 for corresponding China Patent Application No. 201480053825.8 (7 pgs.).

International Search Report for corresponding PCT Application No. PCT/KR2014/009083, dated Jan. 19, 2015, with English Translation (5 pages).

Written Opinion for corresponding PCT Application No. PCT/KR2014/009083, dated Jan. 19, 2015 (5 pages).

* cited by examiner

[Fig. 1]
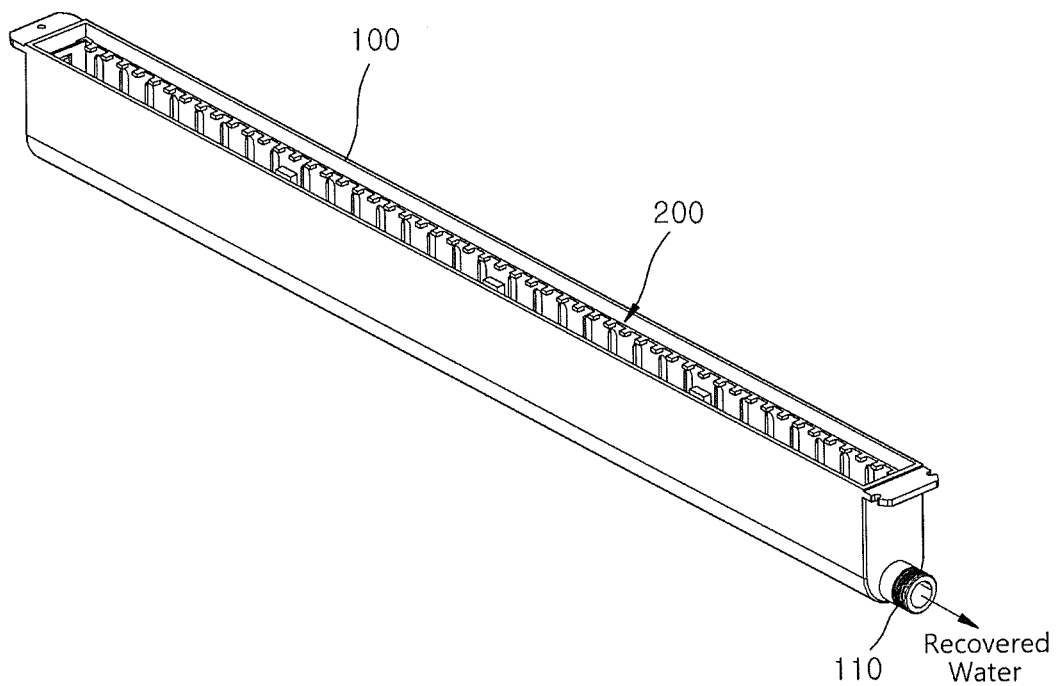

[Fig. 2]
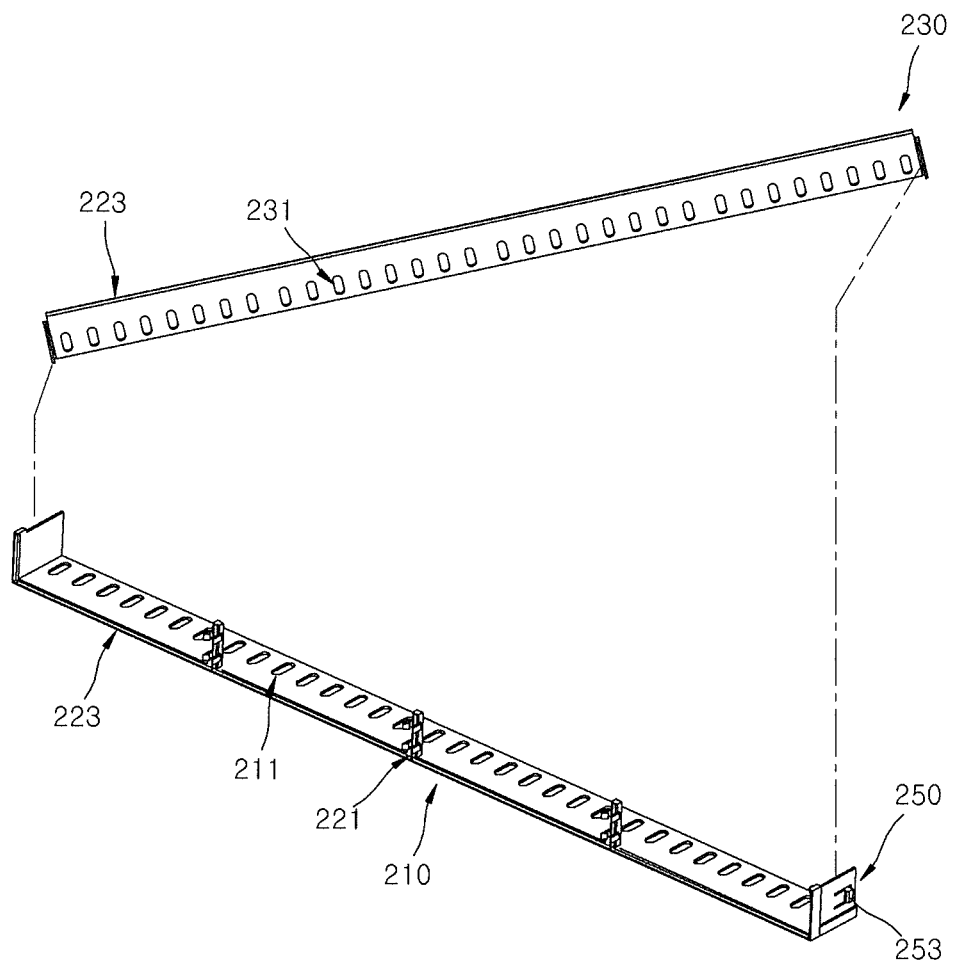

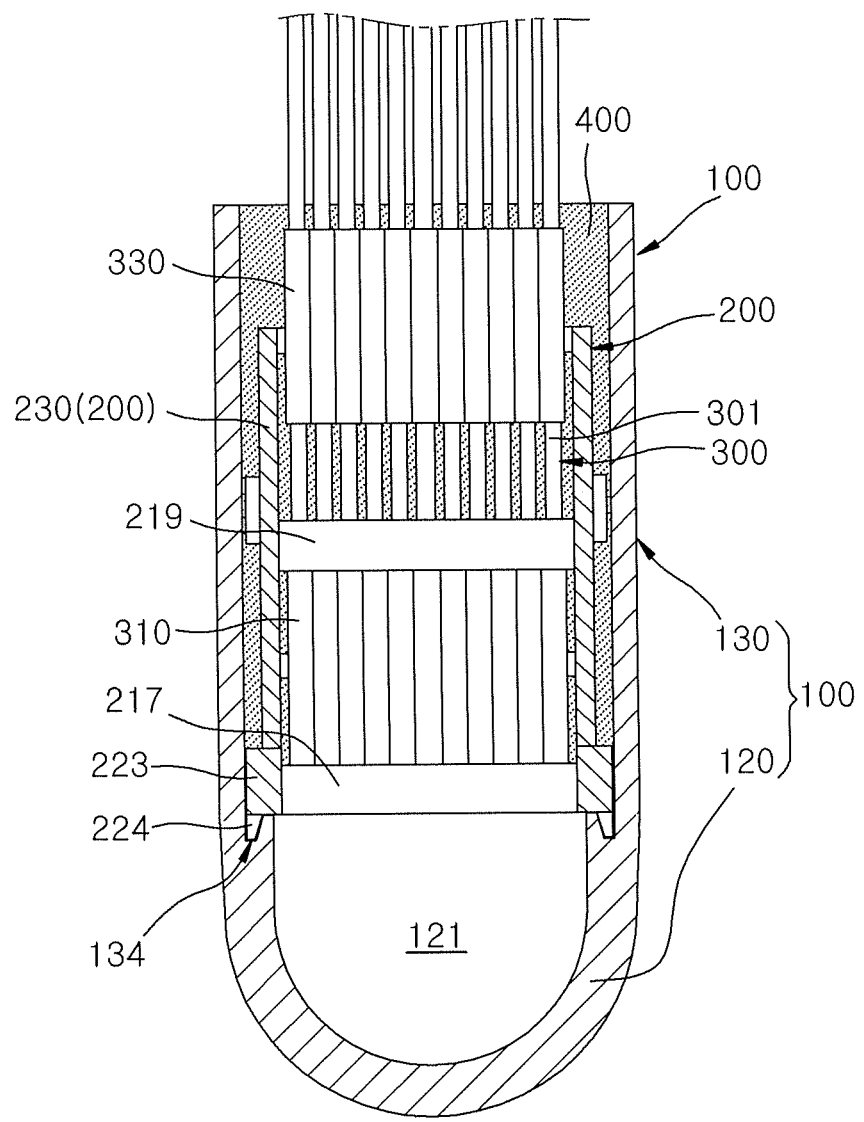
[Fig. 3]

[Fig. 4]
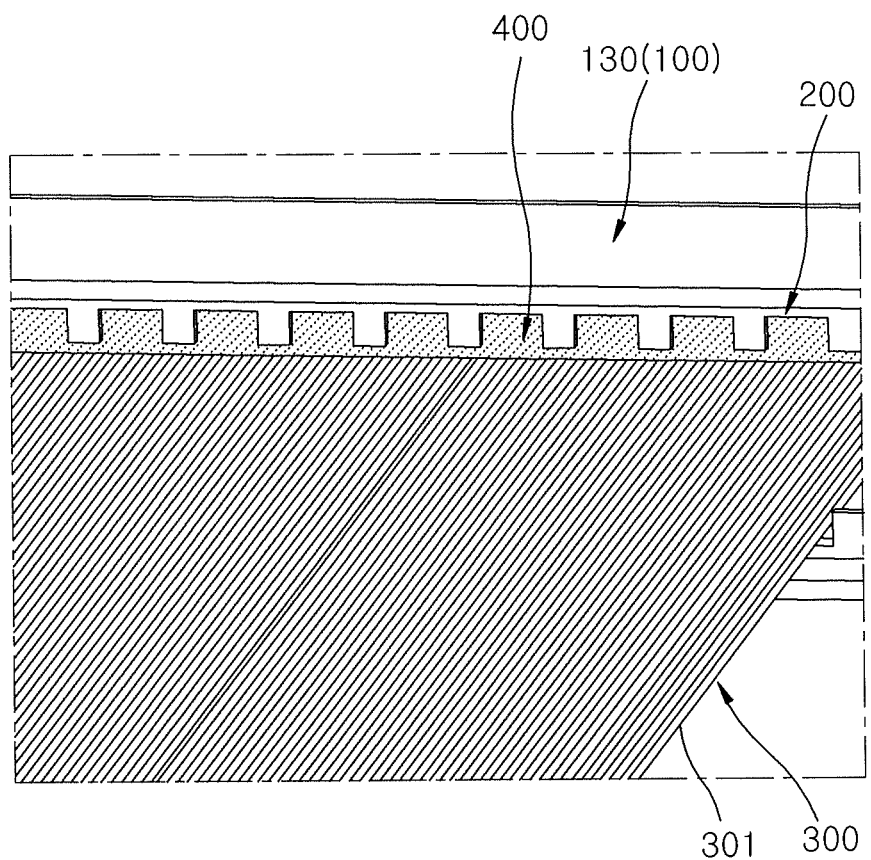

[Fig. 5]
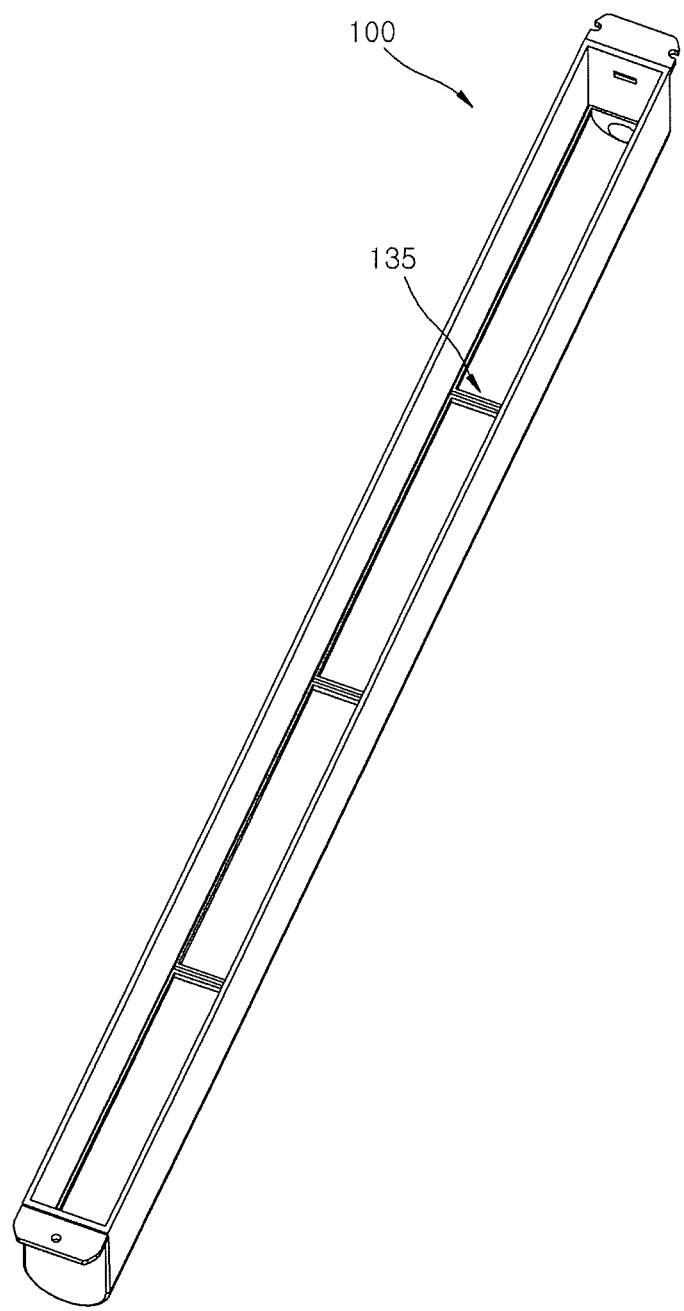

[Fig. 6]
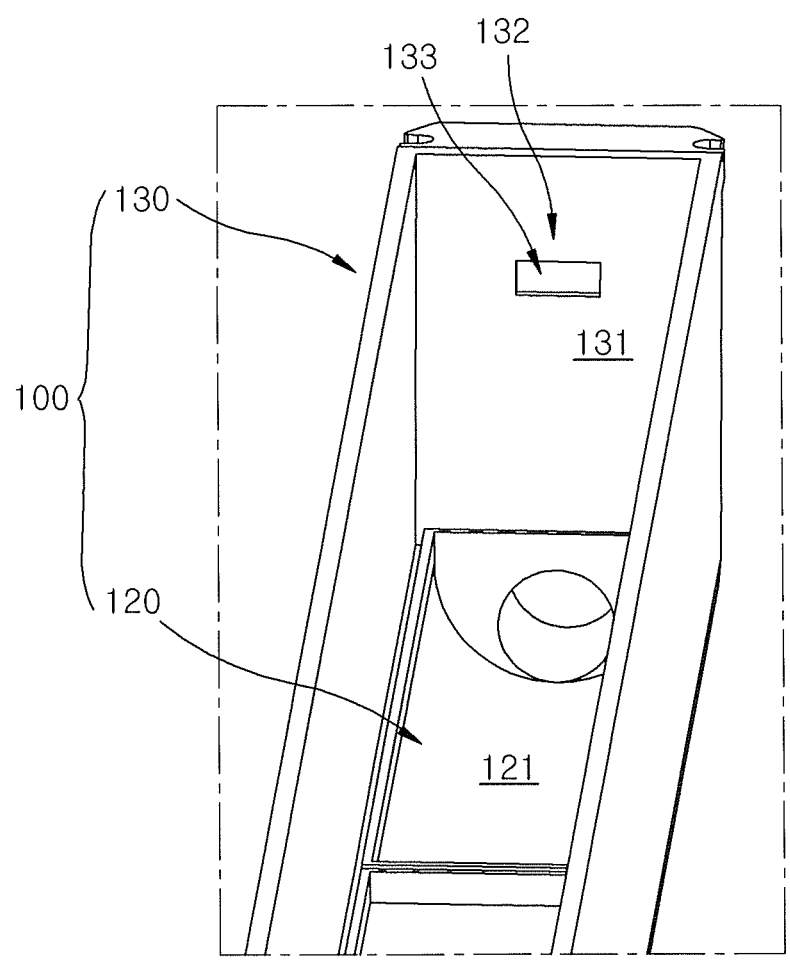

[Fig. 7]
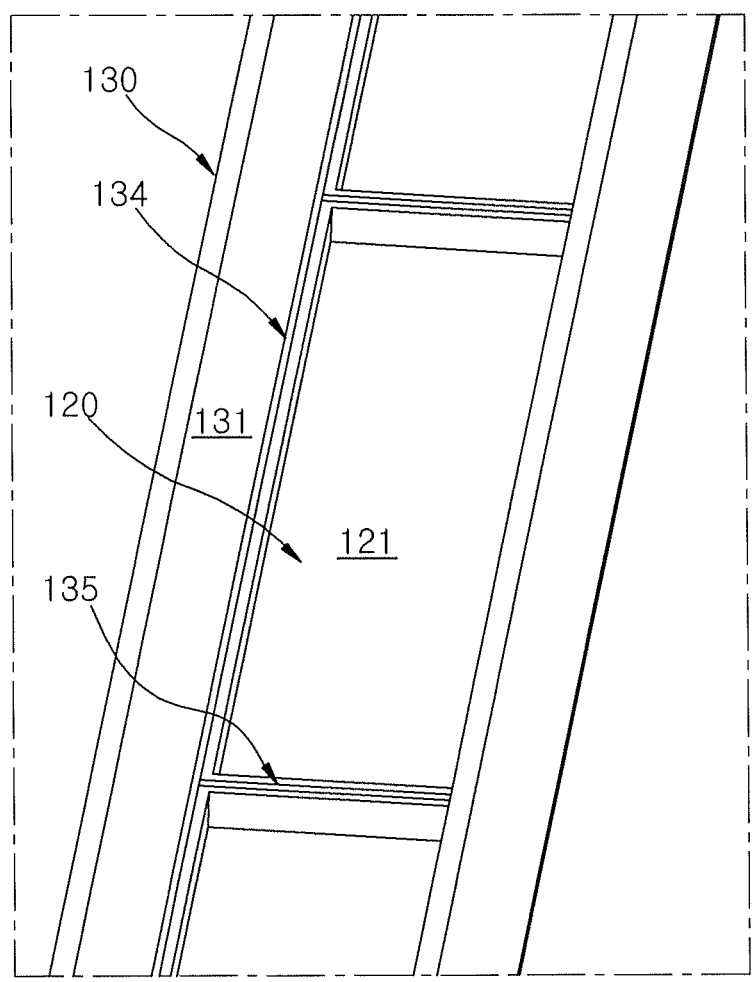

[Fig. 8]
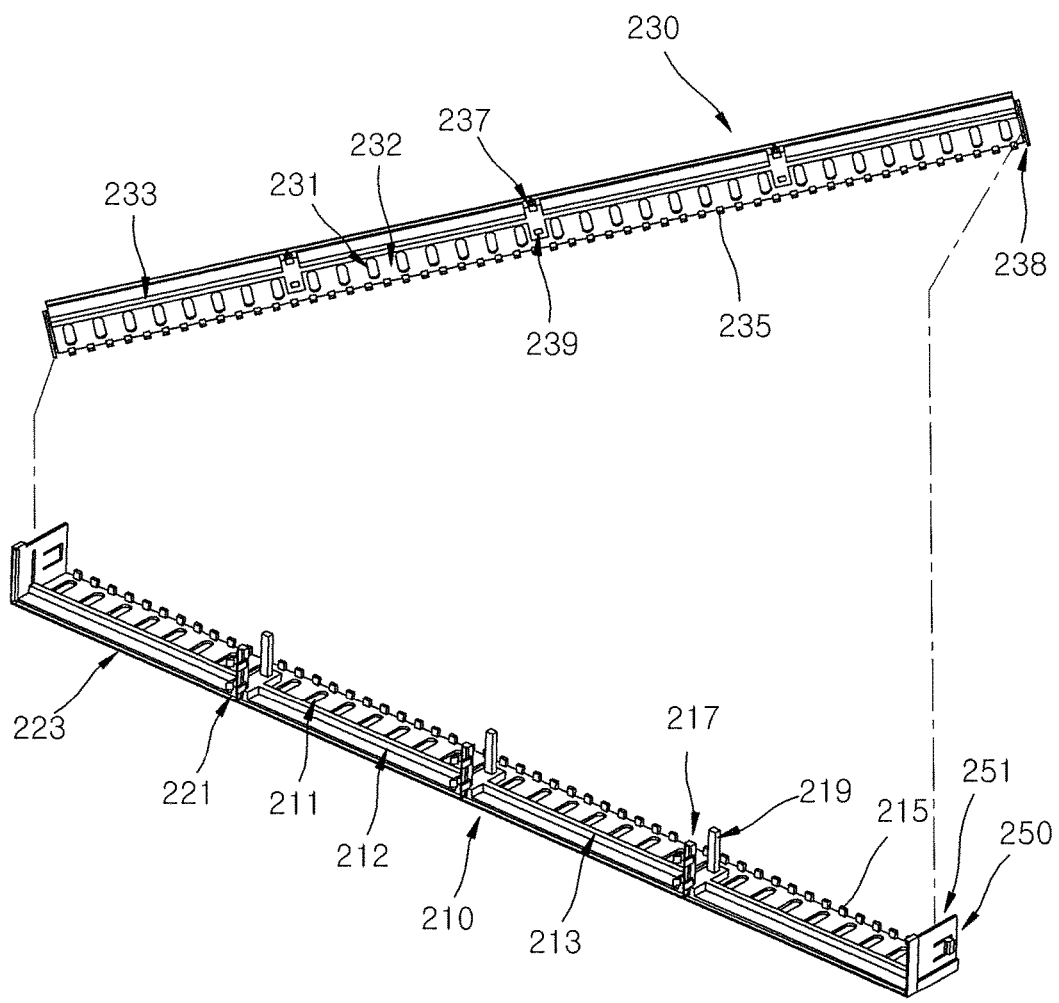

[Fig. 9]
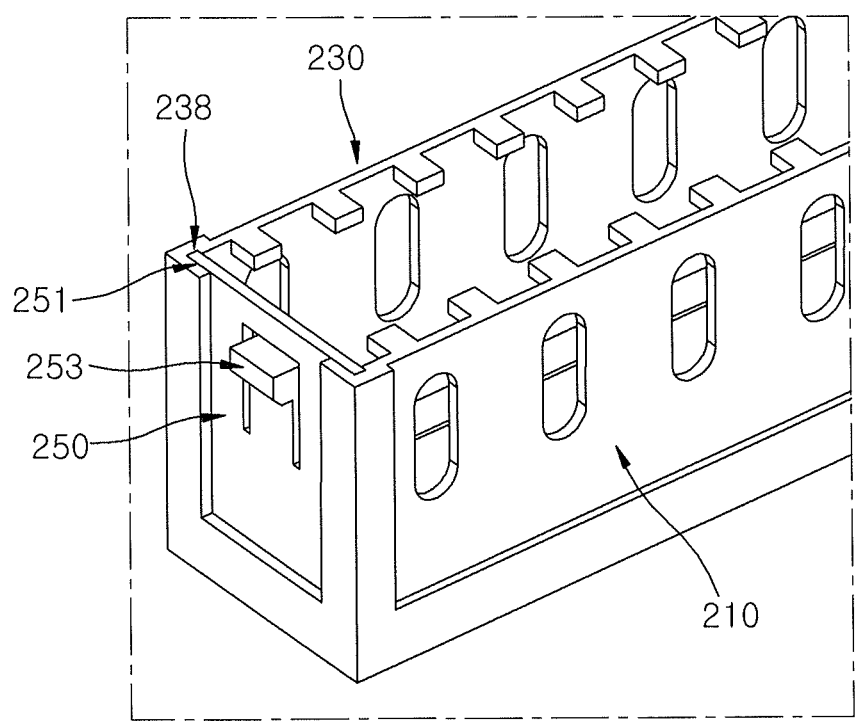

[Fig. 10]
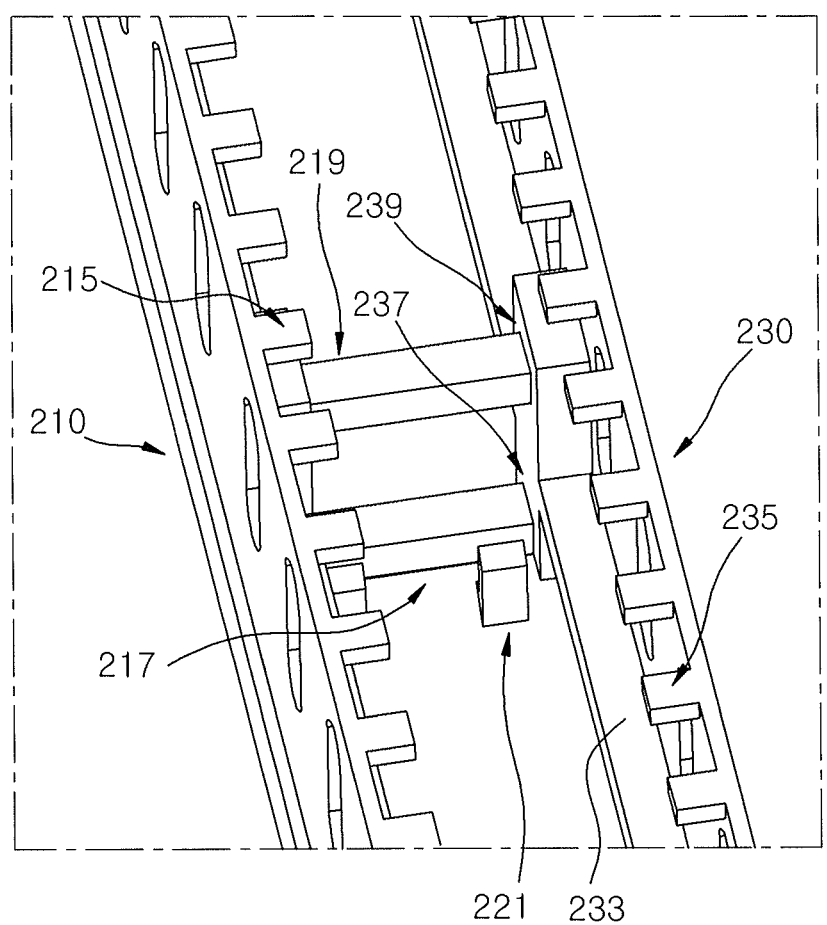

[Fig. 11]
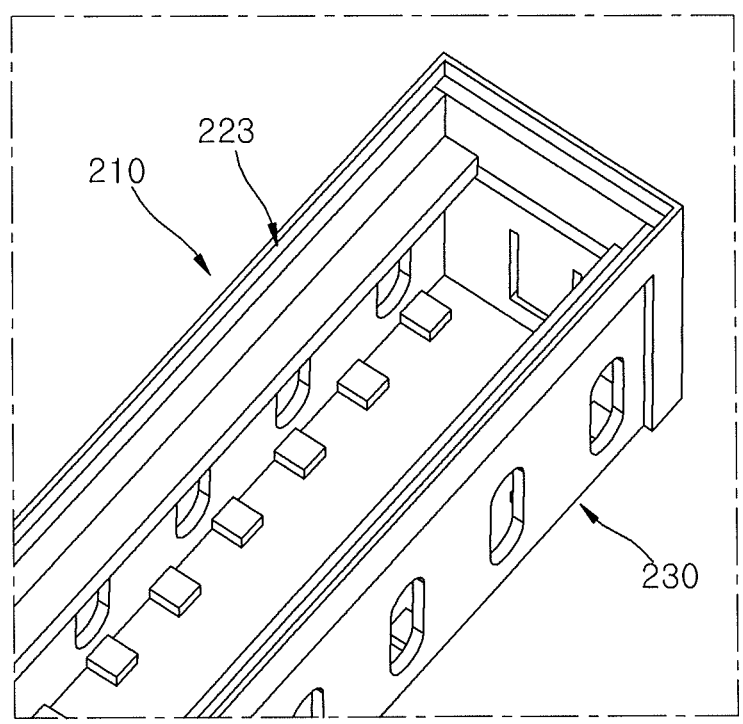

[Fig. 12]
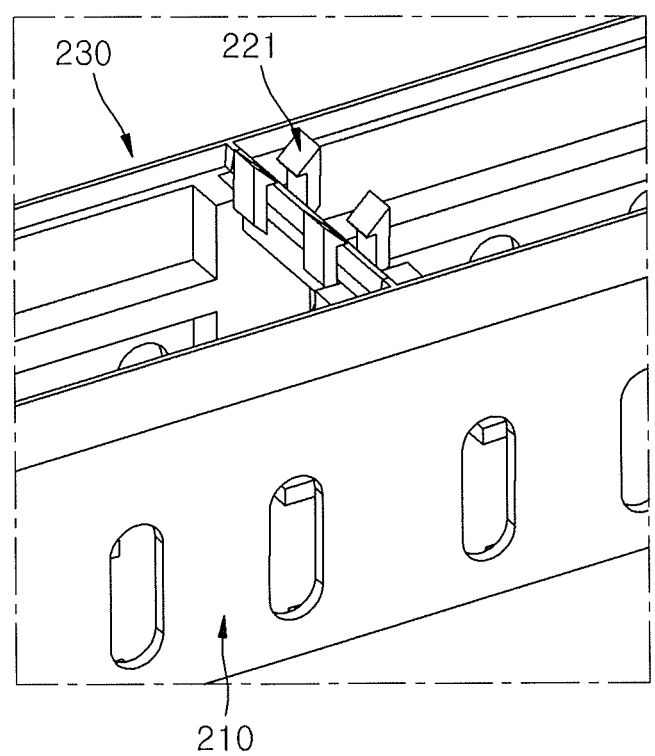

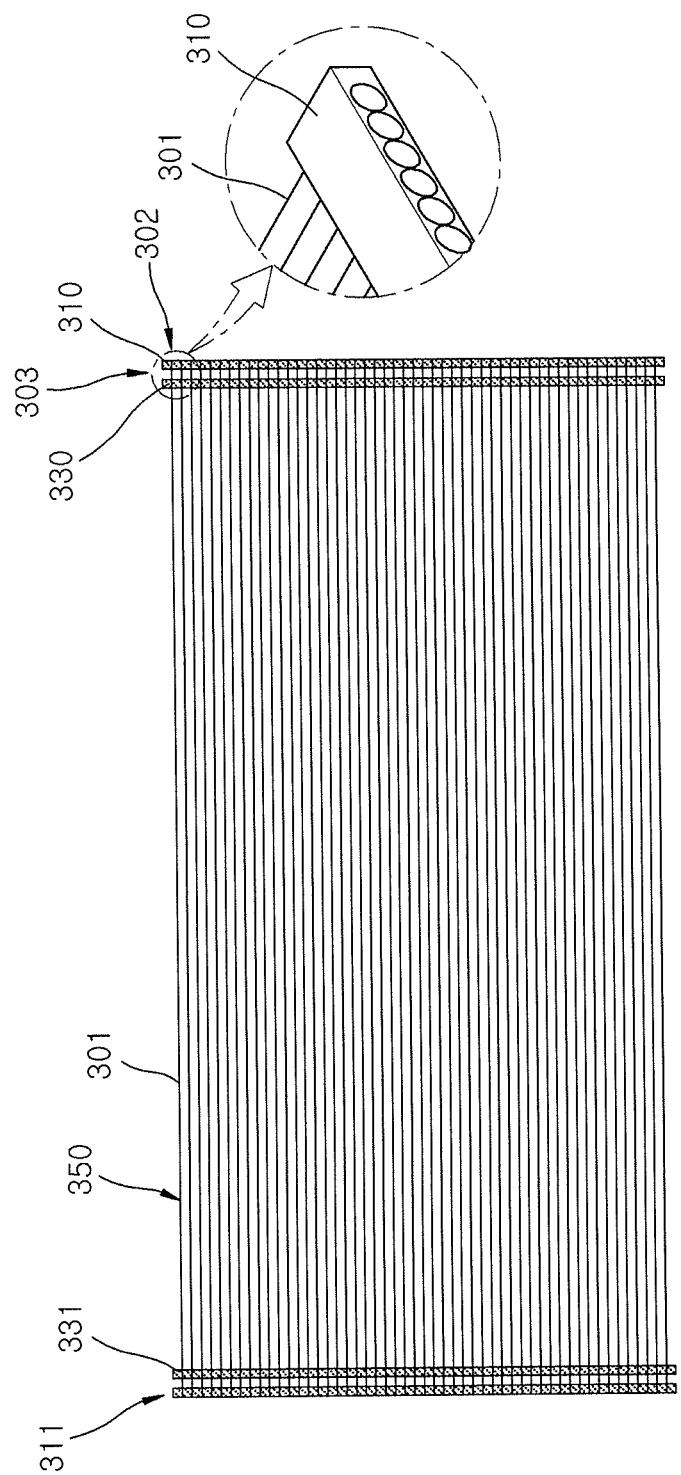
[Fig. 13]

[Fig. 14]
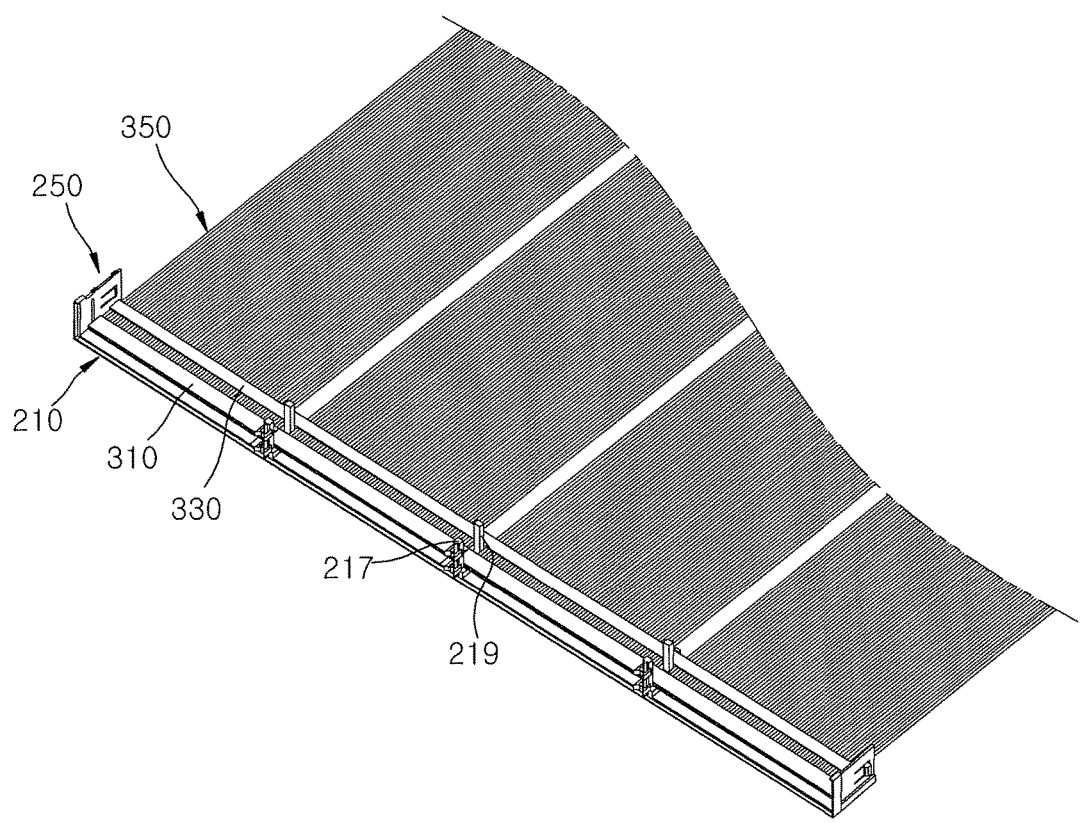

[Fig. 15]
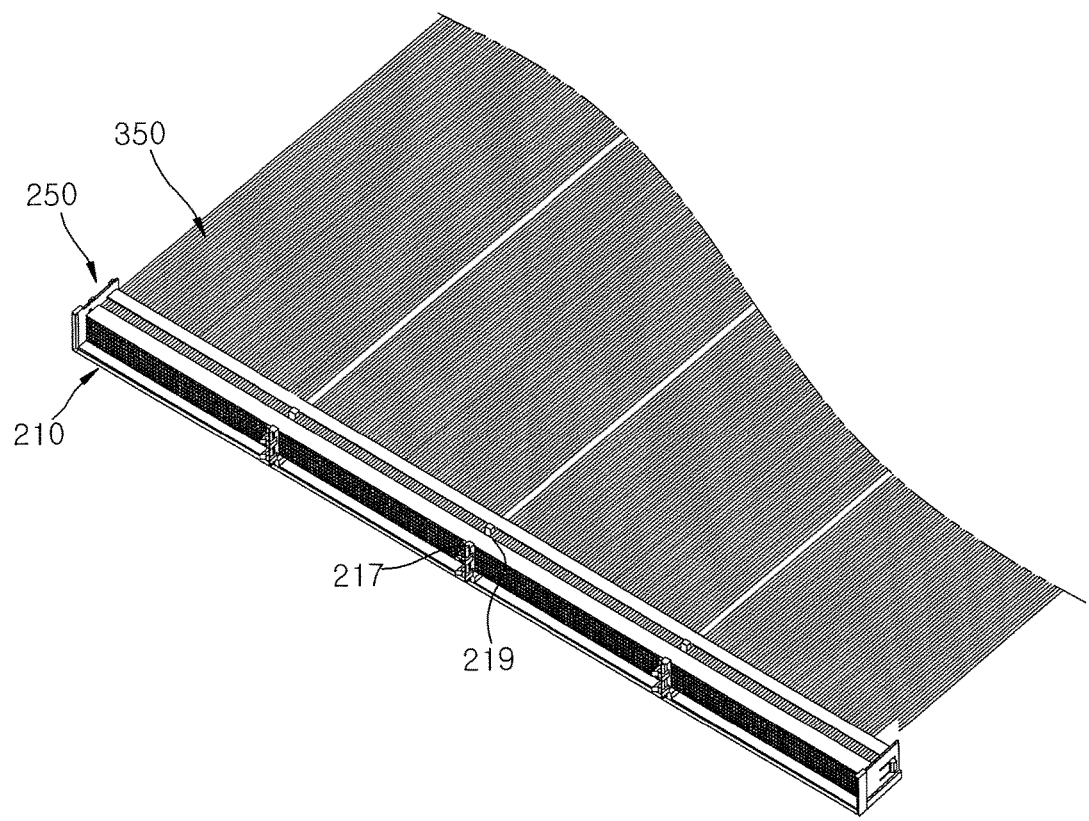

[Fig. 16]
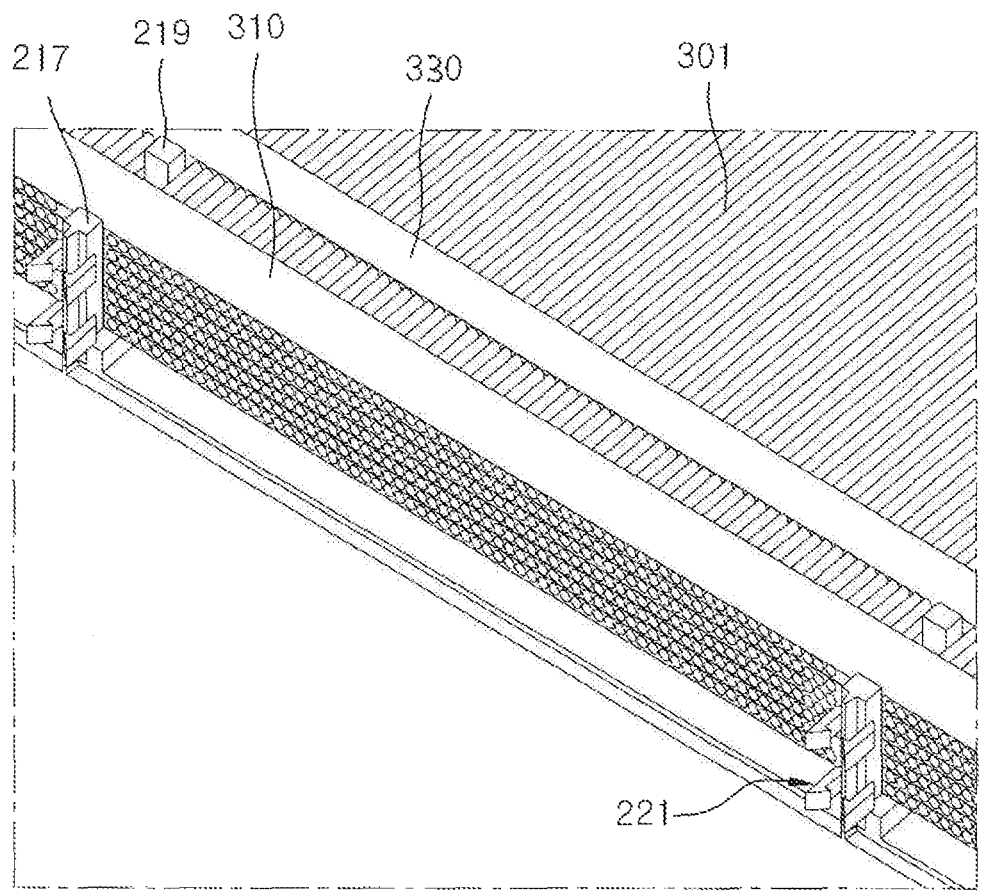

[Fig. 17]
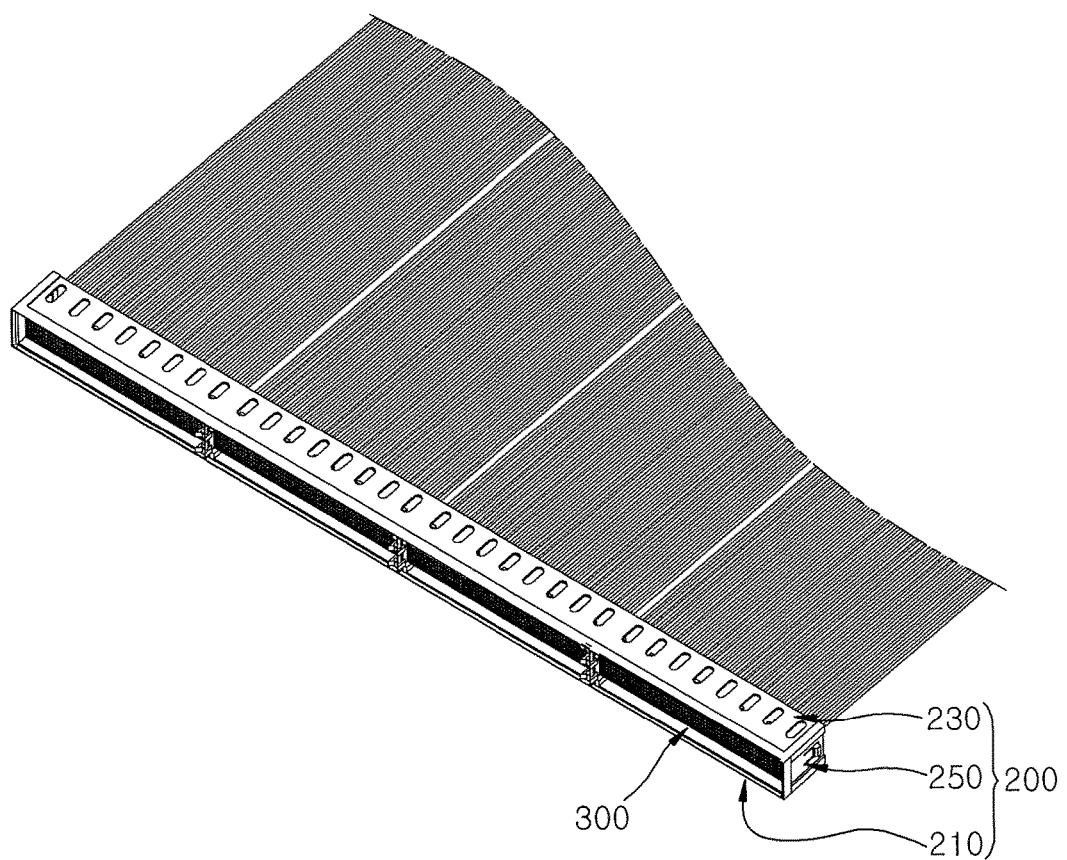

[Fig. 18]
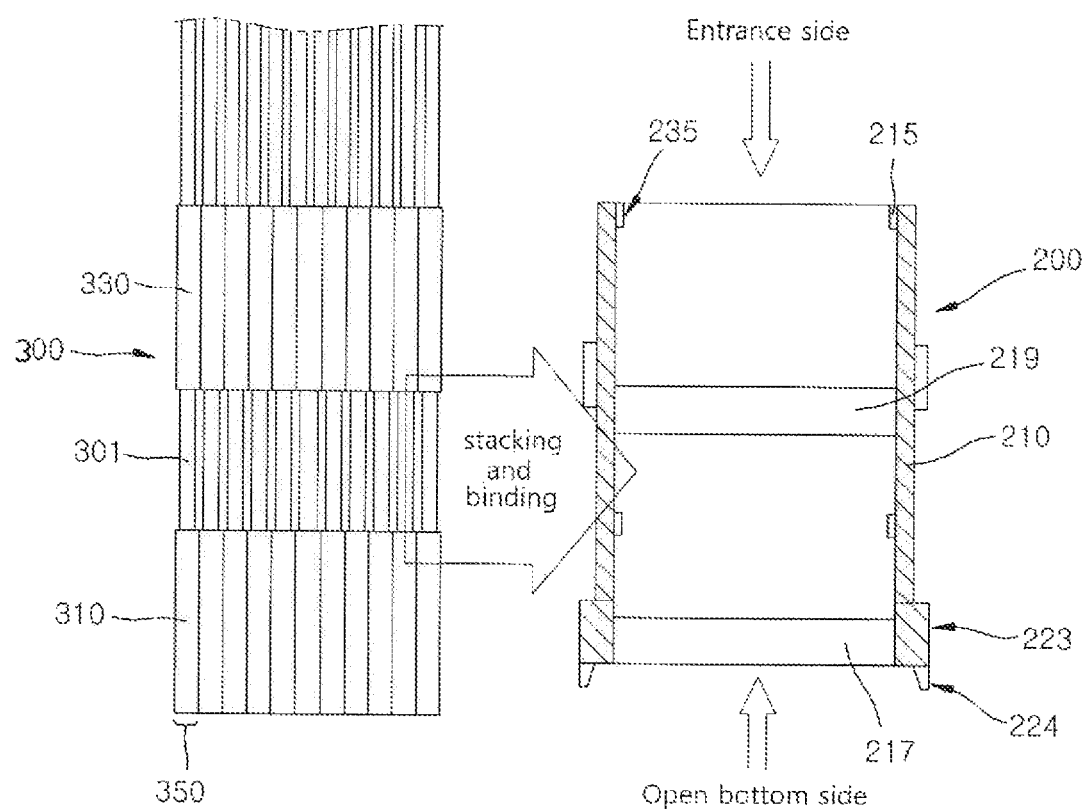

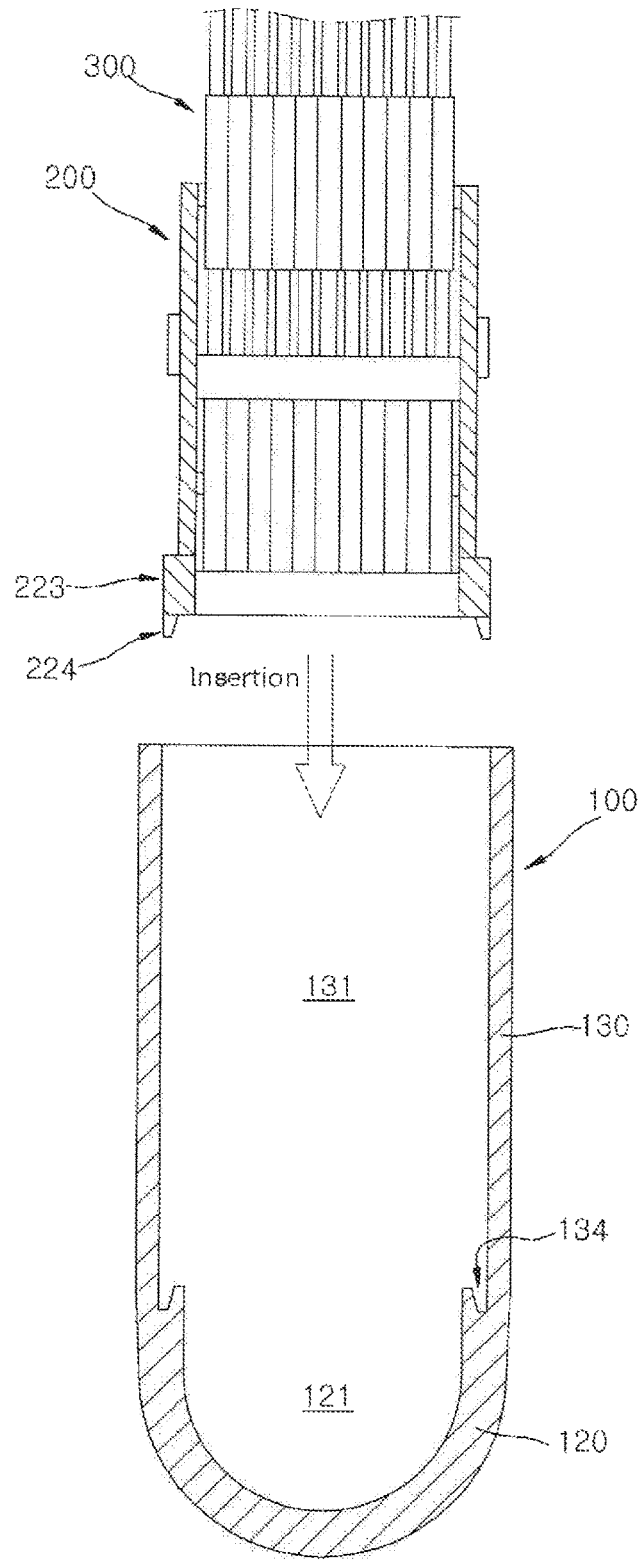
[Fig. 19]

[Fig. 20]
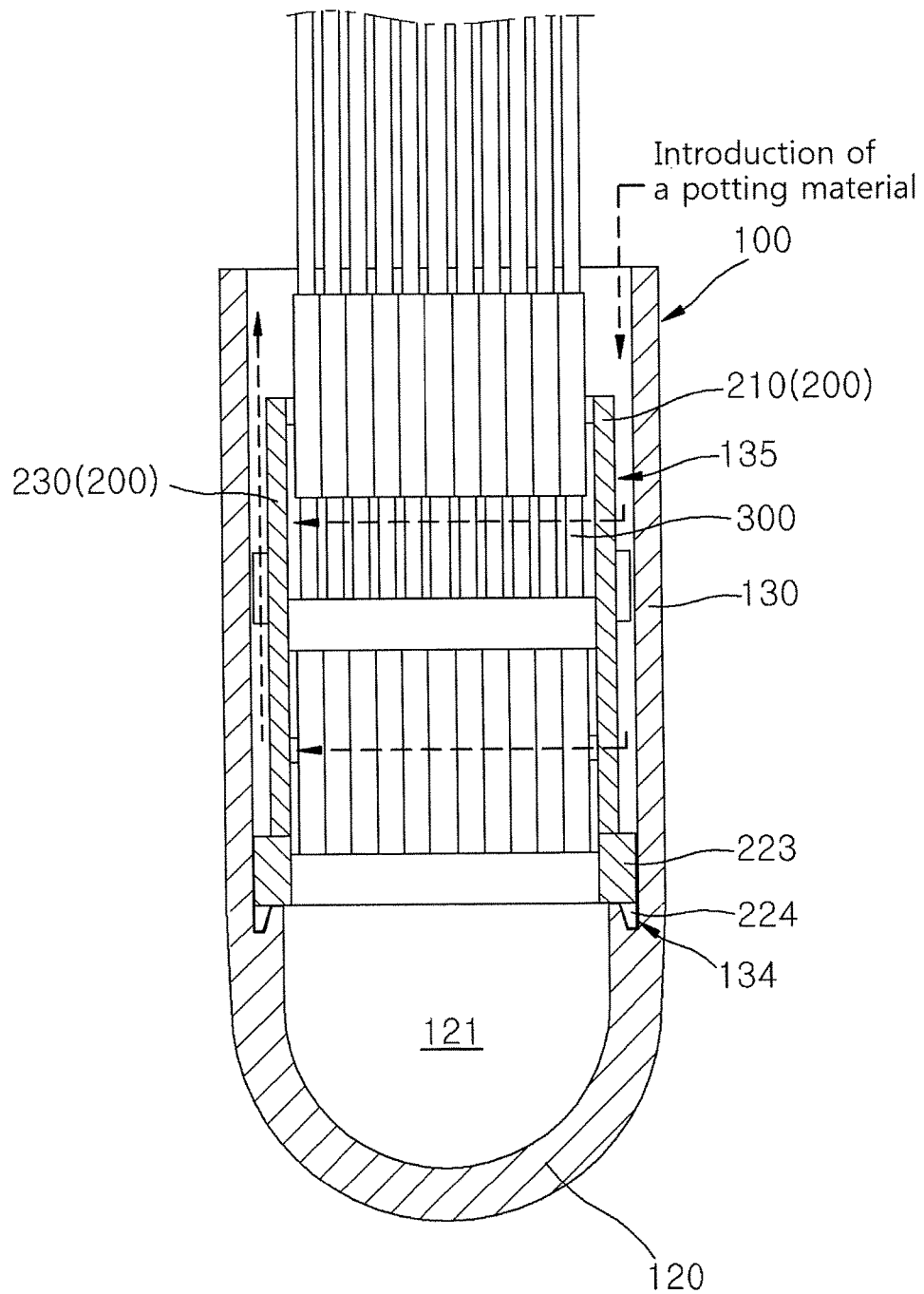

HOLLOW FIBRE MEMBRANE MODULE, MANUFACTURING METHOD THEREFOR, HEADER APPARATUS FOR HOLLOW FIBRE MEMBRANE MODULE AND HOLLOW FIBRE MEMBRANE RESTRAINING APPARATUS

CROSS-REFERENCE TO RELATED APPLICATIONS

This application is a National Phase Patent Application and claims priority to and the benefit of International Application Number PCT/KR2014/009083, filed on Sep. 29, 2014, which claims priority to Korean Patent Application Number 10-2013-0116960, filed on Sep. 30, 2013, the entire contents of all of which are incorporated herein by reference.

TECHNICAL FIELD

Embodiments of the present disclosure relate to a water treatment technique, and more particularly, to a hollow fiber membrane module, a method for manufacturing the same, and a header apparatus and hollow fiber membrane binding apparatus for the same.

BACKGROUND ART

A technology for selective separation of materials through membranes is used in water treatment such as water purification and treatment of industrial water, re-used water, waste water, and the like. In order to improve productivity of water purification, hollow fiber membranes are generally used as the membranes. A module or filtering apparatus using hollow fiber membranes may have a structure wherein a bundle of hollow fiber membranes is secured to a header and filtered water is collected by the header. A hollow fiber membrane module may be operated in a dipping manner or in a compressive manner which can provide superior capabilities in treatment of produced water despite requirements for a separate system for fluid circulation.

A hollow fiber membrane unit includes a bundle in which plural hollow fiber membranes are arranged. Side portions of one end of each of the hollow fiber membranes are fixed to a header by a potting material, thereby forming a module. In order to prevent an exposed hollow potion of an end of the hollow fiber membrane from being blocked by the potting material, a complex process, such as performing a potting process by introducing a fugitive material that temporarily blocks the end of the hollow fiber membrane and is removed in a subsequent process, spreading the process of introducing the potting material, or introducing a cutting process for partially cutting a potted end of the hollow fiber membrane, is needed in coupling of the hollow fiber membranes to the header.

Technical Problem

Embodiments of the present disclosure provide a method for manufacturing a hollow fiber membrane module in which hollow fiber membranes are more securely coupled to a header using a hollow fiber membrane binding apparatus for binding one end of each of hollow fiber membranes as a jig, a hollow fiber membrane module manufactured by the same, a hollow fiber membrane binding apparatus for the same, and a header apparatus including the hollow fiber membrane binding apparatus.

Technical Solution

In accordance with one aspect of the present disclosure, there is provided a hollow fiber membrane module, including: a hollow fiber membrane mat laminate; a header providing a water collection channel to which a distal end of the mat laminate is exposed and providing an insertion space into which one end of the mat laminate is inserted; a hollow fiber membrane binding unit pressing and binding the one end of the mat laminate and inserted into and coupled to the insertion space; and a potting layer adhesively holding the one end of the mat laminate to seal the water collection channel.

The hollow fiber membrane binding unit may include: a first longitudinal wall portion and a second longitudinal wall portion each having a through-slit, wherein inner walls of the first and second longitudinal wall portions face each other to press and bind the one end of the mat laminate; and transverse wall portions connecting both ends of the first longitudinal wall portion to both ends of the second longitudinal wall portion, respectively.

The potting layer may pass through the through-slits and adhere to an inner wall of the header.

The mat laminate may include mats in which hollow fiber membranes are arranged side by side; and the hollow fiber membrane module may further include a first projecting post which protrudes from an inner wall of the first longitudinal wall portion and serves as a reference with respect to which one end of the mat is aligned.

The first projecting post may include a plurality of first projecting posts protruding from the inner wall of the first longitudinal wall portion and arranged in a longitudinal axis direction of the first longitudinal wall portion.

The plurality of first projecting posts may protrude to be coupled at ends thereof to an inner wall of the second longitudinal wall portion.

The mat may further include a first holding band adhesively holding a side portion of one end of the hollow fiber membrane, and the first projecting post may support an edge of the first holding band.

The hollow fiber membrane module may further include a second projecting post spaced apart from the first projecting post and protruding from the inner wall of the first longitudinal wall portion to pass between the hollow fiber membranes of the mat.

The second projecting post may protrude to be coupled at an end thereof to an inner wall of the second longitudinal wall portion.

The mat may further include a first holding band adhesively holding a side portion of one end of the hollow fiber membrane and a second holding band spaced apart from the first holding band; the first projecting post may support an edge of the first holding band; and the second projecting post may protrude between the hollow fiber membranes to support a portion of the mat between the first holding band and the second holding band.

Each of the first and second longitudinal wall portions may further include an upper mat holding portion protruding inward from an entrance side edge thereof at which the hollow fiber membranes of the mat laminate extend outward, wherein the upper mat holding portion presses and holds the mat laminate.

The upper mat holding portion may include a plurality of protrusions protruding inward from an edge of each of the first and second longitudinal wall portions.

Each of the first and second longitudinal wall portions may further include a lower mat holding portion protruding inward from an open bottom side edge thereof adjacent to the one end of the mat laminate, wherein the lower mat holding portion presses and holds the mat laminate.

The lower mat holding portion may include a projecting bar extending in a longitudinal axis direction of the first and second longitudinal wall portions.

The second longitudinal wall portion may further include a coupling slot into which an edge of the transverse wall portion is inserted to be coupled thereto.

The header may include: a first housing section providing the water collection channel; and a second housing section connected to the first housing section and providing an insertion space into which the first and second longitudinal wall portions are inserted.

The first and second longitudinal wall portions may be spaced apart from an inner wall of the second housing section.

The hollow fiber membrane module may further include an end coupling portion for coupling to the second housing section on an outer wall of each of the transverse wall portions.

The hollow fiber membrane module may further include a sealing portion protruding outwardly of an outer wall of each of the first and second longitudinal wall portions from an open bottom side edge of each of the first and second longitudinal wall portions adjacent to the one end of the mat laminate, wherein the sealing portion is pressed against the inner wall of the second housing section at an end thereof to seal a lower end of a space between the inner wall of the second housing section and each of the first and second longitudinal wall portions.

The hollow fiber membrane module may further include a longitudinal coupling bar placed under the sealing portion and inserted into a longitudinal coupling groove of the second housing section.

The first and second longitudinal wall portions may further include an intermediate coupling portion placed at an open bottom side edge thereof adjacent to the one end of the mat laminate and coupled to a transverse coupling groove placed inside the second housing section.

In accordance with another aspect of the present disclosure, there is provided a header apparatus for a hollow fiber membrane module, including: a first housing section providing a water collection channel; a second housing section connected to the first housing section and providing an insertion space; and a hollow fiber membrane binding unit pressing and binding one end of a hollow fiber membrane mat laminate and inserted into the insertion space and comprising a first longitudinal wall portion, a second longitudinal wall portion, and transverse wall portions, wherein each of the first and second longitudinal wall portions has a through-slit, and inner walls of the first and second longitudinal wall portions face each other.

The first and second longitudinal wall portions may be coupled to be spaced apart from an inner wall of the second housing section.

The first and second longitudinal wall portions may be integrally formed with the second housing section to be spaced apart from an inner wall of the second housing section.

In accordance with a further aspect of the present disclosure, there is provided a hollow fiber membrane binding apparatus, including: first and second longitudinal wall portions each having a through-slit, wherein respective inner walls thereof face each other; and two transverse wall portions placed to face each other at both ends thereof in a longitudinal axis direction of the first longitudinal wall portion, wherein mats obtained by arranging hollow fiber membranes side by side are stacked one above another such that one end of each of the mats is aligned with one end of another mat to form a mat laminate on the first longitudinal wall portion, and the second longitudinal wall portion is coupled to the transverse wall portions to press and bind the mat laminate.

The hollow fiber membrane binding apparatus may further include: an end coupling portion for coupling to a header on an outer wall of the transverse wall portion, wherein the mat laminate is secured to the header.

The first and second longitudinal wall portions may further include: a sealing portion protruding outwardly of an outer wall thereof from an open bottom side edge thereof adjacent to the one end of the mat, wherein the sealing portion is pressed against an inner wall of the header at an end thereof to seal a lower end of a space between the outer wall of the first and second longitudinal wall portions and an inner wall of a header to which the mat laminate is secured.

The first and second longitudinal wall portions may further include: intermediate coupling portions provided at an open bottom side edge thereof adjacent to the one end of the mat, wherein the intermediate coupling portions couple the first and second longitudinal wall portions to a header to which the mat laminate is secured.

In accordance with yet another aspect of the present disclosure, there is provided a method for manufacturing a hollow fiber membrane module, including: pressing and binding, by a hollow fiber membrane binding unit, one end of a hollow fiber membrane mat laminate; inserting the hollow fiber membrane binding unit into an insertion space of a header providing a water collection channel and the insertion space to couple the hollow fiber membrane binding unit to the header; and forming a potting layer adhesively holding the one end of the mat laminate to seal the water collection channel.

In the method, the hollow fiber membrane binding unit may include: first and second longitudinal wall portions each having a through-slit, wherein inner walls thereof face each other; and two transverse wall portions placed to face each other at both ends thereof in a longitudinal axis direction of the first longitudinal wall portion, wherein the second longitudinal wall portion is coupled to the transverse wall portions to press and bind the mat laminate.

In the method, forming a potting layer may include introducing a potting material into a space between the first longitudinal wall portion and an inner wall of the body of the header such that the introduced potting material passes through the through-slit of the first longitudinal wall portion, percolates between the hollow fiber membranes of the mat laminate, passes through the through-slit of the second longitudinal wall portion, and fills a space between the second longitudinal wall portion and the inner wall of the body of the header.

In the method, the hollow fiber membrane binding unit may further include: a sealing portion protruding outwardly of an outer wall of each of the first and second longitudinal wall portions from an open bottom side edge of each of the first and second longitudinal wall portions adjacent to the one end of the mat to be pressed against the inner wall of the header at an end thereof to seal a lower end of a space between the outer wall of each of the first and second longitudinal wall portions and the inner wall of the header, wherein the introduced potting material is prevented from flowing into the water collection channel by the sealing portion.

Advantageous Effects

Embodiments of the present disclosure provide a method for manufacturing a hollow fiber membrane module in which hollow fiber membranes are more securely coupled to a header using a hollow fiber membrane binding apparatus for binding one end of each of hollow fiber membranes as a jig, a hollow fiber membrane module manufactured by the same, a hollow fiber membrane binding apparatus for the same, and a header apparatus including the hollow fiber membrane binding apparatus.

DESCRIPTION OF DRAWINGS

FIGS. 1 to 4 are views illustrating a hollow fiber membrane module according to one embodiment of the present disclosure.

FIGS. 5 to 7 are views illustrating a header apparatus of a hollow fiber membrane module according to one embodiment of the present disclosure.

FIGS. 8 to 12 are views illustrating a hollow fiber membrane binding apparatus of a hollow fiber membrane module according to one embodiment of the present disclosure.

FIGS. 13 to 20 are views illustrating a hollow fiber membrane module according to one embodiment of the present disclosure and a method for manufacturing the same.

BEST MODE

A hollow fiber membrane module according to one embodiment of the present disclosure includes: a hollow fiber membrane mat laminate; a header providing a water collection channel to which a distal end of the mat laminate is exposed and providing an insertion space into which one end of the mat laminate is inserted; a hollow fiber membrane binding unit pressing and binding the one end of the mat laminate and inserted into and coupled to the insertion space; and a potting layer adhesively holding the one end of the mat laminate to seal the water collection channel.

Hereinafter, embodiments of the present disclosure will be described in detail with reference to the accompanying drawings. The following embodiments are provided by way of example so as to fully convey the spirit of the present disclosure to those skilled in the art to which the present disclosure pertains. Accordingly, the present disclosure is not limited to the embodiments disclosed herein and can also be implemented in different forms. In the drawings, widths, lengths, thicknesses, and the like of elements can be exaggerated for clarity and descriptive purposes. It will be understood that when an element is referred to as being "on" another element, it can be directly on the other element or intervening elements may also be present. Throughout the specification, like reference numerals denote like elements having the same or similar functions. As used herein, the singular forms "a", "an", and "the" may encompass the plural forms as well, unless context clearly indicates otherwise. The terms "comprises", "comprising", "including", and "having" are inclusive and therefore specify the presence of stated features, integers, steps, operations, elements, and/or components, but do not preclude the presence or addition of one or more other features, integers, steps, operations, elements, components, and/or groups thereof. As used herein, spatially relative terms such as "upper" and "lower" are defined with reference to the accompanying drawings, and can be used interchangeably. As used herein, the "hollow fiber membrane module" means an apparatus including hollow fiber membranes and a header holding the hollow fiber membranes, and may further include a module housing into which the hollow fiber membranes are introduced. In addition, the hollow fiber membrane module may further include additional features constituting a filtering apparatus including the hollow fiber membranes.

Referring to FIGS. 1 to 3, a hollow fiber membrane module may include a header 100 (FIG. 1), a hollow fiber membrane binding unit 200, and a hollow fiber membrane mat laminate 300 (FIG. 3). As shown in FIG. 1, the header 100 may be coupled to the hollow fiber membrane binding unit 200 to form a header module. The hollow fiber membrane binding unit 200 may be inserted into or fastened to the header 100. Alternatively, the header 100 may be integrally formed with the hollow fiber membrane binding unit 200.

Referring to FIGS. 1 and 2, the hollow fiber membrane binding unit 200 may be used as a jig for binding or bundling one end of the hollow fiber membrane mat laminate 300 (FIG. 3). The hollow fiber membrane binding unit 200 or apparatus may include a first longitudinal wall portion 210, a second longitudinal wall portion 230, and two transverse wall portions 250. The first and second longitudinal wall portions 210, 230 may take the form of a long band or plate and have a plurality of through-slits 211, 231 passing through a body thereof. The through-slits 211, 231 may provide passages through which a potting material is introduced in a subsequent potting process.

The transverse walls 250 may be placed at both ends of the hollow fiber membrane binding unit in a longitudinal axis direction of the first longitudinal wall portion 210. The transverse wall portions 250 may be used as portions through which the first and second longitudinal wall portions 210, 230 are coupled to each other and by which the first and second longitudinal wall portions are supported. In one embodiment, the transverse wall portions 250 may be provided separately from the first longitudinal wall portion 210. In another embodiment, the transverse wall portions 250 may be integrally formed with the first longitudinal wall portion 210. Alternatively, the first longitudinal wall portion 210, the second longitudinal wall portion 230, and the transverse wall portions 250 may be integrally formed with one another.

Each of the transverse wall portions 250 may be provided on an outer wall thereof with an end coupling portion 253 to couple the hollow fiber membrane binding unit 200 to the header 100 upon insertion of the hollow fiber membrane binding unit 200 into the header 100, as shown in FIG. 1. Each of the first and second longitudinal wall portions 210, 230 may be provided at a lower end thereof with a sealing portion 223, an end of which is pressed against an inner wall of the header 100 to seal a lower end of a space between the inner wall of the header 100 (FIG. 1) and outer walls of the first and second longitudinal wall portions. The seal portion 223 may be provided in the form of a bar protruding outward from the lower end of each of the first and second longitudinal wall portions 210, 230 to prevent a potting material from percolating into an underlying water collection channel 121 (FIG. 3), wherein the potting material is introduced to form a potting layer 400 (FIG. 3).

In addition, each of the first and second longitudinal wall portions 210, 230 may be provided at an open bottom side edge of the hollow fiber membrane binding unit with a plurality of intermediate coupling portions 221 to couple the first and second longitudinal wall portions 210, 230 to the header 100 (FIG. 1).

Referring to FIG. 3 again, the hollow fiber membrane binding unit 200 may allow the hollow fiber membrane mat laminate 300 to be inserted into the header 100. One end of each of hollow fiber membranes 301 constituting the hollow fiber membrane mat laminate 300 may be bound by the hollow fiber membrane binding unit 200, as shown in FIG. 2. Here, the rest of the hollow fiber membrane may extend outwardly of the header 100 to be inserted into a module housing part (not shown) to which the header 100 will be connected. The hollow fiber membrane mat laminate 300 may be formed by stacking one or more hollow fiber membrane mats one above another, wherein the hollow fiber membrane mat may have a structure in which a plurality of hollow fiber membrane 301 is aligned side by side. In other words, the hollow fiber membranes 301 may be arranged side by side to form a sheet or mat shape, and such hollow fiber membrane mats may be stacked one above another to form a mat laminate 300 having the form of a block.

Further, a first holding band 310 adhesively holding a side portion of one end of the mat and a second holding band 330 spaced apart from the first holding band 330 may be realized by, for example, adhesive layers such as hot melt glue layers.

The header 100 may include: a first housing section 120 providing a water collection space or channel 121, to which an end of the hollow fiber membrane mat laminate 300 is exposed; and a second housing section 130 providing an insertion space, which is connected to the water collection channel 121 such that the hollow fiber membrane binding unit 200 is inserted thereinto. A housing portion 120, 130 including the first and second housing sections 120, 130 may be integrally formed by injection molding. The hollow fiber membrane binding unit 200 inserted into the second housing section 130 of the header 100 may be used as a jig for pressing and binding one end of the hollow fiber membrane mat laminate 300 and substantially guiding the one end of the mat laminate 300 to be inserted into the header 100.

Referring to FIGS. 3 and 4, the mat laminate 300 may be bonded and secured to the header 100 and the hollow fiber membrane binding unit 200 by a potting layer 400, which is obtained by curing a potting material introduced into a space between the header 100 and the hollow fiber membrane binding unit 200. The water collection channel 121, which is disposed under the header 100 such that a distal end of the mat laminate 300 is exposed to the water collection channel 121, may be sealed by the potting layer 400. Purified water filtered through the hollow fiber membranes 301 constituting the mat laminate 300 may flow into and collect in the water collection channel 121 from hollow portions of the ends of the hollow fiber membranes 301 exposed to the water collection channel 121 and then may be recovered through a water outlet 110 connected to the water collection channel 121. Contaminated water or raw water, in which the hollow fiber membranes 301 are dipped, can be prevented from flowing into the water collection channel 121 by the potting layer 400.

Referring to FIG. 5 together with FIG. 1, the header 100 into which the hollow fiber membrane binding unit 200 is fixedly inserted may have a semi-cylindrical shape. In addition, the header may be provided therein with coupling portions for coupling to the hollow fiber membrane binding unit 200. For example, the header 110 may be provided in an inner bottom thereof with a transverse coupling groove 135 for coupling to the hollow fiber membrane binding unit 200. Further, as shown in FIG. 6, the header 100 may be provided with an end coupling groove 133 for coupling to the hollow fiber membrane binding unit 200 in an inner wall of a transverse wall portion 132 thereof adjacent to the insertion space 131 into which the hollow fiber membrane binding unit 200 is inserted, wherein the end coupling groove 133 is intended to be coupled to the end coupling portion 253 (FIG. 2). In addition, the header may be provided in an inner wall of a longitudinal wall portion thereof with a longitudinal coupling groove 134 for coupling to the hollow fiber membrane binding unit 200, as shown in FIGS. 6 and 7. Such coupling portions provided inside the header 100 will be more fully described when further explaining the form of the hollow fiber membrane binding unit 200 below.

Referring to FIG. 8 together with FIG. 1, the hollow fiber membrane binding unit 200 constituting the hollow fiber membrane module may be used a jig for binding or bundling one end of the hollow fiber membrane mat laminate 300 (FIG. 3). The hollow fiber membrane binding unit or apparatus 200 may include a first longitudinal wall portion 210, a second longitudinal wall portion 230, and two transverse wall portions 250. The first and second longitudinal wall portions 210, 230 may take the form of a long band or plate and have a plurality of through-slits 211, 231 passing through a body thereof. First through-slits 211 of the first longitudinal wall portion 210 and second through-slits 231 of the second longitudinal wall portion 230 may be placed to face each other. Although the first through-slits may have a different shape than the second through-slits, it should be understood that the first through-slits may also have substantially the same size, form, and position as the second through-slits. Such through-slits 211, 231 may provide passages through which a potting material is introduced in a subsequent potting process.

The transverse wall portions 250 may be placed at both ends of the hollow fiber membrane binding unit in the longitudinal axis direction of the first longitudinal wall portion 210. The transverse wall portions 250 may be used as a reference with respect to which both lateral sides of the hollow fiber membrane mat laminate 300 to be bound by the hollow fiber membrane binding unit 200 are aligned with each other such that mats constituting the mat laminate 300 can be stacked and aligned more accurately. In one embodiment, the transverse wall portions 250 may be provided separately from the first longitudinal wall portion 210. In another embodiment, the transverse wall portions 250 may be integrally formed with the first longitudinal wall portion 210.

Referring to FIGS. 6 and 9 together with FIG. 8, each of the transverse wall portions 250 may be provided on an outer wall thereof with an end coupling portion 253 (FIG. 9) to couple the hollow fiber membrane binding unit 200 to the header 100. The end coupling portion 253 may take the form of a latch which is coupled to the end coupling groove 133 (FIG. 6) formed on the transverse wall portion 132 (FIG. 6) of the header 100, such that the hollow fiber membrane binding unit 200 can be coupled to the header 100 through a hook coupling with the latch.

Referring to FIGS. 8 and 9 again, the second longitudinal wall portion 230 may be provided at both ends thereof in the longitudinal axis direction with a coupling slot 238, into which an edge portion 251 of the transverse wall 250 will be inserted, as a coupling portion for coupling to the transverse wall portion 250. For example, the edge portion 251 of the transverse wall portion 250 is inserted into the coupling slot 238, whereby the second longitudinal wall portion 230 can be coupled to the transverse wall portion 250. In this case, it is possible to provide the hollow fiber membrane binding unit 200 having a box shape which is open both at an entrance side and an open bottom side opposite the entrance side, wherein the hollow fiber membrane mat laminate 300 (FIG. 3) is inserted from the entrance side.

Referring to FIGS. 8 and 10, the first and second longitudinal wall portions 210, 230 may be respectively provided with upper mat holding portions 215, 235 protruding inward from the entrance side edge. The upper mat holding portions may include a plurality of first protrusion-shaped upper mat holding portions 215 protruding from the first longitudinal wall portion 210. In addition, the upper mat holding portions may include a plurality of second protrusion-shaped upper mat holding portions 235 protruding from the second longitudinal wall portion 210 and placed to face or to be offset from the first upper mat holding portions 215. The upper mat holding portions 215, 235 serve to press a side surface of one end of the mat laminate 300 to improve binding force, thereby restricting flow of the mat laminate 300, when the hollow fiber membrane binding unit 200 binds the hollow fiber membrane mat laminate 300 (FIG. 2).

The first and second longitudinal wall portions 210, 230 may be respectively provided at the open bottom side edge thereof with lower mat holding portions 213, 233 pressing a side portion of one end of the mat laminate 300 to provide additional fixation. The lower mat fixing portions 213, 233 serve to press a side surface of one end of the mat laminate 300 to improve binding force, thereby restricting flow of the mat laminate 300, when the hollow fiber membrane binding unit 200 binds the hollow fiber membrane mat laminate 300 (FIG. 3). A first lower mat holding portion 213 provided in the form of a projecting bar protruding from the first longitudinal wall portion 210 may extend in the longitudinal axis direction of the first longitudinal wall portion 210 to serve as a warpage prevention portion supporting the first longitudinal wall portion 210 to prevent the first longitudinal wall portion from warping. A second lower mat holding portion 233 provided in the form of a projecting bar protruding from the second longitudinal wall portion 230 may extend in the longitudinal axis direction of the second longitudinal wall portion 230 to serve as a warpage prevention portion supporting the second longitudinal wall portion 230 to prevent the second longitudinal wall portion from warping. In one embodiment, two or more lower mat holding portions 213, 233 may be placed to face each other.

Referring to FIGS. 8 and 10 again, the first longitudinal wall portion 210 may be provided with a plurality of first projecting posts 217 protruding from a first inner wall thereof. The first projecting post 217 may serve as a reference with respect to which one end of the mat laminate 300 is aligned in alignment of the hollow fiber membrane mat laminate 300. When the second longitudinal wall portion 230 is coupled to the transverse wall portions 250, an end of the first projecting post 217 may be inserted into a first post coupling groove 237 formed on a second inner wall 232 of the second longitudinal wall portion 230. The first longitudinal wall portion may be provided with a plurality of second projecting posts 219 spaced apart from the first projecting posts 217. The second projecting post 219 may protrude from the first inner wall 212 of the first longitudinal wall portion 210 to be inserted into and coupled to a second post coupling groove 239 formed on the second inner wall 232 of the second longitudinal wall portion 230.

The first and second projecting posts 217, 219 may serve to support and hold the holding bands 310, 330 (FIG. 3) of the hollow fiber membrane mat laminate 300, respectively. The first projecting post 217 may support an edge of the first holding band 310 adhesively holding the side portions of one end of each of the hollow fiber membranes 301 (FIG. 3), thereby providing a reference with respect to which the mat laminate 300 is aligned. In addition, the second projecting post 219 may protrude between portions of the hollow fiber membranes 301 placed between the first holding band 310 (FIG. 3) and the second holding band 330 (FIG. 3) spaced apart from the first holding band and may support the second holding band 330. As such, by allowing the second holding band 330 to be supported by the second projecting post 219, the ends of the mat laminate 300 can be precisely aligned with one another.

The first and second projecting posts 217, 219 may be placed at intervals in the longitudinal axis direction of the first longitudinal wall portion 210. Accordingly, the first and second projecting posts may be used as a means for directly coupling the second longitudinal wall portion 210 to the first longitudinal wall portion 210. In addition, since the first and second projecting posts 217, 219 are inserted into the first and second post coupling grooves 237, 239, respectively, the first and second longitudinal wall portions 210, 230 can be prevented from warping or bending, or it is possible to prevent any clearance between the first and second longitudinal wall portions at the middle portion thereof.

Referring to FIGS. 8 and 11, each of the first and second longitudinal wall portions 210, 230 may be provided with a sealing portion 223 protruding outwardly of an outer wall thereof from the open bottom side edge thereof and pressed against the inner wall of the header 100 at an end thereof to seal a lower end of a space between the inner wall of the header 100, to which the mat laminate 300 (FIG. 3) will be secured, and the outer wall of each of first and second longitudinal wall portions. The sealing portion 223 may be provided in the form of a bar protruding outward from the lower end of each of the first and second longitudinal wall portions 210, 230 to prevent a potting material from percolating into the underlying water collection channel 121 (FIG. 3), wherein the potting material is introduced to form the potting layer 400 (FIG. 3). The sealing portion 223 will be additionally described when explaining a potting process to be described below.

Referring to FIGS. 8 and 12 together with FIG. 5, the first and second longitudinal walls 210, 230 may be provided at the open bottom side edge thereof with the intermediate coupling portion 221 for coupling the header 100 (FIG. 5) to the first and second longitudinal wall portions 210, 230. The header 100 may be provided with the transverse coupling groove 135 (FIG. 5) for coupling to the intermediate coupling portion 221. In one embodiment, one or more intermediate coupling portions and transverse coupling grooves may be provided.

As shown in FIG. 1, the hollow fiber membrane binding unit 200 may be introduced into the header 100 to form a header apparatus and may also form the hollow fiber membrane module, as shown in FIG. 3. Here, the hollow fiber membrane binding unit 200 can guide the hollow fiber membrane mat laminate 300 (FIG. 3) to be precisely aligned and can restrain the hollow fiber membrane mat laminate from being out of alignment. In this case, the hollow fiber membrane binding unit may be used as a jig inhibiting the hollow fiber membranes 301 (FIG. 3) in the mat laminate 300 from flowing out of the mat laminate or being misaligned or suppressing potting failure during insertion of the mat laminate 300 into the header 100 or formation of the potting layer 400 (FIG. 3). Although the hollow fiber membrane binding unit 200 may be manufactured separately of the header 100 and then inserted into and coupled to the header, it should be understood that the hollow fiber membrane binding unit may also be integrally formed with the header 100.

Next, a process of manufacturing a hollow fiber membrane module will be described, and, in the process thereof, a hollow fiber membrane module, a hollow fiber membrane binding unit for the same, and a header apparatus including the hollow fiber membrane binding unit will be additionally described.

Referring to FIG. 13, a method for manufacturing a hollow fiber membrane module includes providing a hollow fiber membrane mat 350. A mat 350 in which one or more hollow fiber membranes 301 are arranged side by side is formed using an apparatus for manufacturing a hollow fiber membrane mat. A plurality of hollow fiber membranes 301, for example, 264 hollow fiber membranes, constituting the mat 350 mat be arranged side by side, followed by introducing and securing the holding bands 310, 330, 311, 331 to both ends of a group of hollow fiber membranes, thereby forming the mat 350. The first and second holding bands 310, 330 introduced to one end of the mat 350; and the third and fourth holding bands 311, 331 corresponding thereto may be formed of, for example, an adhesive such as hot melt glue.

Referring to FIG. 14, after a plurality of hollow fiber membrane mats 350 is provided, the mats 350 are sequentially stacked on the first longitudinal wall portion 210 of the hollow fiber membrane binding unit 200. As a result, the hollow fiber membrane mat laminate 300 in which one or more mats 350 are stacked in an aligned manner on the first longitudinal wall portion 210 can be formed, as shown in FIG. 15. Here, the hollow fiber membrane mats 350 may be aligned such that one or more first projecting posts 217 (FIG. 8) support the first holding band 310 placed at one end 303 of the hollow fiber membrane mat 350. In addition, as shown in FIG. 16, the mat 350 is threaded onto one or more second projecting posts 219 such that the second projecting posts 219 pass between portions of the hollow fiber membranes 301 located between the first and second holding bands 310, 330, whereby the mats 350 can be stacked in an aligned manner in such a way that the second holding band 330 is supported by the second projecting posts 219. Accordingly, ends of the mats 350 can be precisely aligned with one another, as shown in FIG. 15. As the mats are stacked, the first holding bands 310 are stacked one above another in an aligned manner to form a first band block and the second fixing bands 330 are stacked one above another in an aligned manner to form a second band block.

Referring to FIGS. 17 and 18, the second longitudinal wall portion 230 of the hollow fiber membrane binding unit 200 is coupled to the transverse wall portion 250 to press and bind a side surface of one end of the hollow fiber membrane mat laminate 300. Accordingly, the hollow fiber membrane mat laminate 300, one end of which is bound by the first and second longitudinal wall portions 210, 230 and the transverse wall portion 250 and thus prevented from being misaligned can be obtained. The hollow fiber membrane binding unit 200 may be used as a jig for stacking the hollow fiber membranes into a hollow fiber membrane mat laminate and binding the hollow fiber membrane mat laminate 300.

Referring to FIGS. 19 and 20, the hollow fiber membrane binding unit 200 by which one end of the hollow fiber membrane mat laminate 300 has been bound is inserted into the second housing section 130 of the header 100. Coupling portions provided to the hollow fiber membrane binding unit 200 are coupled to the header, such that the hollow fiber membrane binding unit 200 can be coupled to the second housing section 130 of the header 100. The sealing portion 223 of the hollow fiber membrane binding unit 200 may be pressed against an inner wall of the second housing section 130 of the header 100 at an end thereof. For this, the sealing portion 223 may be provided at a lower end thereof with a bottom coupling portion 224 taking the form of a projecting longitudinal coupling bar, which is intended to be inserted into a longitudinal coupling groove 134 provided inside the second housing section 130. The sealing portion 223 may take the form of a projecting bar extending in the longitudinal axis direction of the first and second longitudinal wall portions 210, 230 and thus can also serve as a warpage prevention portion preventing the first and second longitudinal wall portions 210, 230 from warping.

The first and second longitudinal wall portions 210, 230 of the hollow fiber membrane binding unit 200 may be inserted to be separated a predetermined distance from the inner wall of the second housing section 130, thereby providing an inflow space 135, into which a potting material will flow, between the inner wall of the second housing section and the first and second longitudinal wall portions. The sealing portion 223 serves to block and seal a lower end of the potting material-inflow space 135, thereby preventing the potting material having flowed into the space from percolating into the underlying water collection channel 121.

Referring to FIG. 20 together with FIG. 3, the potting material may be introduced into any one 135 of inflow spaces 135 between the first and second longitudinal wall portions 210, 230 of the hollow fiber membrane binding unit 200 and the inner wall of the second housing section 130, for example, into an inflow space 135 between the first longitudinal wall portion 210 and the inner wall of the second housing section 130.

The potting material may include, for example, polyurethane. The introduced potting material may pass through the first through-slits 211 (FIG. 8) of the first longitudinal wall portion 210, percolate between the hollow fiber membranes 301 of the mat laminate 300, pass through the opposite second through-slits 231 of the second longitudinal wall portion 230, and fill the inflow space 135 between the second longitudinal wall portion 230 and the inner wall of the second housing section 130. Then, the potting material is subjected to curing to form a potting layer 400 (FIG. 3) securing the mat laminate 300 or the hollow fiber membranes 301 bound in the form of the mat laminate 300.

Since the sealing portion 223 prevents the potting material from percolating into the underlying water collection channel 121 and the hollow fiber membranes 301 constituting the mat laminate 300 are bound by the binding unit 200 and the first holding band 310 formed at one end of the mat laminate is bound by and pressed against the binding unit 200, the potting material can be prevented from flowing or percolating into the underlying water collection channel 121. In addition, as the mat laminate 300 is formed, the first holding bands 310 are stacked one above another to form the first band block band, which is pressed against and coupled to the first and second longitudinal wall portions 210, 230 and the transverse wall portions 250, thereby preventing the potting material from flowing toward the water collection channel 121. It can be confirmed that the potting material does not flow or percolate into the underlying water collection channel 121 through visual inspection or a leakage test after formation of the potting layer 400. In addition, it can be experimentally confirmed that the potting material does not leak even upon application of pneumatic pressure.

The hollow fiber membrane binding unit 200 according to the present disclosure may be used as a jig for stacking and binding one end of each of hollow fiber membranes 301 into a mat laminate 300 in which mats 350 are stacked one above another. The header apparatus including the hollow fiber membrane binding unit 200 may take the form in which the hollow fiber membrane binding unit 200 is inserted into and coupled to the header 100, and allows the hollow fiber membrane mat laminate 300 to be more securely held by the hollow fiber membrane binding unit 200. Accordingly, the hollow fiber membrane module employing the header apparatus including the hollow fiber membrane binding unit or apparatus 200 can eliminate a need for a fugitive material, can be manufactured without consuming an excess of a potting material while effectively reducing the time required for a potting process, and can effectively prevent leakage of a potting layer.

Although some embodiments have been described herein, it should be understood by those skilled in the art that various modifications, variations and alterations can be made without departing from the spirit and scope of the present disclosure set forth in the accompanying claims.

LIST OF REFERENCE NUMERALS

100: Header 200: Hollow fiber membrane binding unit
210, 230: Longitudinal wall portion 250: Transverse wall portion
211, 231: Through-slit 233: Sealing portion
300: Hollow fiber membrane mat laminate 400: Potting layer

The invention claimed is:
1. A hollow fiber membrane module, comprising:
a hollow fiber membrane mat laminate;
a header providing a water collection channel to which a distal end of the mat laminate is exposed and providing an insertion space into which one end of the mat laminate is inserted;
a hollow fiber membrane binding unit pressing and binding the one end of the mat laminate and inserted into and coupled to the insertion space; and
a potting layer adhesively holding the one end of the mat laminate to seal the water collection channel,
wherein the hollow fiber membrane binding unit comprises:
a first longitudinal wall portion and a second longitudinal wall portion each having a through-slit, inner walls of the first and second longitudinal wall portions facing each other to press and bind the one end of the mat laminate; and
transverse wall portions connecting both ends of the first longitudinal wall portion to both ends of the second longitudinal wall portion, respectively.

2. The hollow fiber membrane module according to claim 1, wherein the potting layer passes through the through-slits and adheres to an inner wall of the header.

3. The hollow fiber membrane module according to claim 1, wherein the mat laminate comprises mats in which hollow fiber membranes are arranged side by side; and the hollow fiber membrane module further comprises a first projecting post which protrudes from an inner wall of the first longitudinal wall portion and serves as a reference with respect to which one end of the mat is aligned.

4. The hollow fiber membrane module according to claim 3, wherein the first projecting post comprises a plurality of first projecting posts protruding from the inner wall of the first longitudinal wall portion and arranged in a longitudinal axis direction of the first longitudinal wall portion.

5. The hollow fiber membrane module according to claim 4, wherein the plurality of first projecting posts protrude to be coupled at ends thereof to an inner wall of the second longitudinal wall portion.

6. The hollow fiber membrane module according to claim 3, wherein the mat further comprises a first holding band adhesively holding a side portion of one end of the hollow fiber membrane, and the first projecting post supports an edge of the first holding band.

7. The hollow fiber membrane module according to claim 3, further comprising:
a second projecting post spaced apart from the first projecting post and protruding from the inner wall of the first longitudinal wall portion to pass between the hollow fiber membranes of the mat.

8. The hollow fiber membrane module according to claim 7, wherein the second projecting post protrudes to be coupled at an end thereof to an inner wall of the second longitudinal wall portion.

9. The hollow fiber membrane module according to claim 7, wherein the mat further comprises a first holding band adhesively holding a side portion of one end of the hollow fiber membrane and a second holding band spaced apart from the first holding band;
the first projecting post supports an edge of the first holding band; and
the second projecting post protrudes between the hollow fiber membranes to support a portion of the mat between the first holding band and the second holding band.

10. The hollow fiber membrane module according to claim 1, further comprising:
an upper mat holding portion protruding inward from an entrance side edge of each of the first and second longitudinal wall portions, at which the hollow fiber membranes of the mat laminate extend outward,
wherein the upper mat holding portion presses and holds the mat laminate.

11. The hollow fiber membrane module according to claim 10, wherein the upper mat holding portion comprises a plurality of protrusions protruding inward from an edge of each of the first and second longitudinal wall portions.

12. The hollow fiber membrane module according to claim 1, further comprising:
a lower mat holding portion protruding inward from an open bottom side edge of each of the first and second longitudinal wall portions adjacent to the one end of the mat laminate,
wherein the lower mat holding portion presses and holds the mat laminate.

13. The hollow fiber membrane module according to claim 1, wherein the lower mat holding portion comprises a projecting bar extending in a longitudinal axis direction of the first and second longitudinal wall portions.

14. The hollow fiber membrane module according to claim 1, wherein the second longitudinal wall portion further comprises a coupling slot into which an edge of the transverse wall portion is inserted to be coupled thereto.

15. The hollow fiber membrane module according to claim 1, wherein the header comprises:
a first housing section providing the water collection channel; and
a second housing section connected to the first housing section and providing an insertion space into which the first and second longitudinal wall portions are inserted.

16. The hollow fiber membrane module according to claim 15, wherein the first and second longitudinal wall portions are spaced apart from an inner wall of the second housing section.

17. The hollow fiber membrane module according to claim 15, further comprising:
an end coupling portion for coupling to the second housing section on an outer wall of each of the transverse wall portions.

18. The hollow fiber membrane module according to claim 15, further comprising:
a sealing portion protruding outwardly of an outer wall of each of the first and second longitudinal wall portions from an open bottom side edge of each of the first and second longitudinal wall portions adjacent to the one end of the mat laminate,
wherein the sealing portion is pressed against the inner wall of the second housing section at an end thereof to seal a lower end of a space between the inner wall of the second housing section and each of the first and second longitudinal wall portions.

19. The hollow fiber membrane module according to claim 18, further comprising:
a longitudinal coupling bar placed under the sealing portion and inserted into a longitudinal coupling groove of the second housing section.

20. The hollow fiber membrane module according to claim 15, further comprising:
an intermediate coupling portion placed at an open bottom side edge of each of the first and second longitudinal wall portions adjacent to the one end of the mat laminate and coupled to a transverse coupling groove placed inside the second housing section.

* * * * *